US009021831B2

(12) United States Patent
Johnke et al.

(10) Patent No.: US 9,021,831 B2
(45) Date of Patent: May 5, 2015

(54) HYDROCARBON GAS PROCESSING

(75) Inventors: Andrew F. Johnke, Beresford, SD (US); Larry Lewis, Houston, TX (US); John D. Wilkinson, Midland, TX (US); Joe T. Lynch, Midland, TX (US); Hank M. Hudson, Midland, TX (US); Kyle T. Cuellar, Katy, TX (US)

(73) Assignees: Ortloff Engineers, Ltd., Midland, TX (US); S.M.E. Products LP, Houston, TX (US)

( * ) Notice: Subject to any disclaimer, the term of this patent is extended or adjusted under 35 U.S.C. 154(b) by 1231 days.

(21) Appl. No.: 12/689,616

(22) Filed: Jan. 19, 2010

(65) Prior Publication Data
US 2010/0236285 A1   Sep. 23, 2010

Related U.S. Application Data

(63) Continuation-in-part of application No. 12/372,604, filed on Feb. 17, 2009.

(60) Provisional application No. 61/186,361, filed on Jun. 11, 2009.

(51) Int. Cl.
F25J 3/00 (2006.01)
F25J 3/02 (2006.01)
(Continued)

(52) U.S. Cl.
CPC ............. *F25J 3/0209* (2013.01); *F25J 5/007* (2013.01); *F25J 2200/40* (2013.01);
(Continued)

(58) Field of Classification Search
CPC ....... F25J 3/0209; F25J 3/0233; F25J 3/0242; F25J 3/0238; F25J 2270/12; F25J 2240/02; F25J 2200/74; F25J 2270/60; F25J 2270/02; F25J 2200/02; F25J 2205/02; F25J 2210/06; F25J 2290/40; F25J 2200/80; F25J 2205/04; F25J 2235/06

USPC ................... 62/618, 620, 621, 623, 619, 622
See application file for complete search history.

(56) References Cited

U.S. PATENT DOCUMENTS 33,408 A    10/1861  Turner et al. .................. 68/22 R
2,952,985 A *  9/1960  Brandon ......................... 62/628
(Continued)

OTHER PUBLICATIONS

"Dew Point Control Gas Conditioning Units," SME Products Brochure, Gas Processors Assoc. Conference (Apr. 5, 2009).
(Continued)

*Primary Examiner* — Frantz Jules
*Assistant Examiner* — Keith Raymond
(74) *Attorney, Agent, or Firm* — Fitzpatrick, Cella, Harper & Scinto

(57) ABSTRACT

A process and an apparatus are disclosed for the recovery of ethane, ethylene, propane, propylene, and heavier hydrocarbon components from a hydrocarbon gas stream in a compact processing assembly. The gas stream is cooled and divided into first and second streams. The first stream is further cooled to condense substantially all of it and is thereafter expanded to lower pressure and supplied as the top feed to an absorbing means inside the processing assembly. The second stream is also expanded to lower pressure and supplied as the bottom feed to the absorbing means. A distillation vapor stream is collected from the upper region of the absorbing means and directed into one or more heat exchange means inside the processing assembly to heat it while cooling the gas stream and the first stream. A distillation liquid stream is collected from the lower region of the absorbing means and directed into a heat and mass transfer means inside the processing assembly to heat it and strip out its volatile components while cooling the gas stream. The quantities and temperatures of the feeds to the absorbing means are effective to maintain the temperature of the upper region of the absorbing means at a temperature whereby the major portions of the desired components are recovered in the stripped distillation liquid stream.

38 Claims, 9 Drawing Sheets

Figure 1:
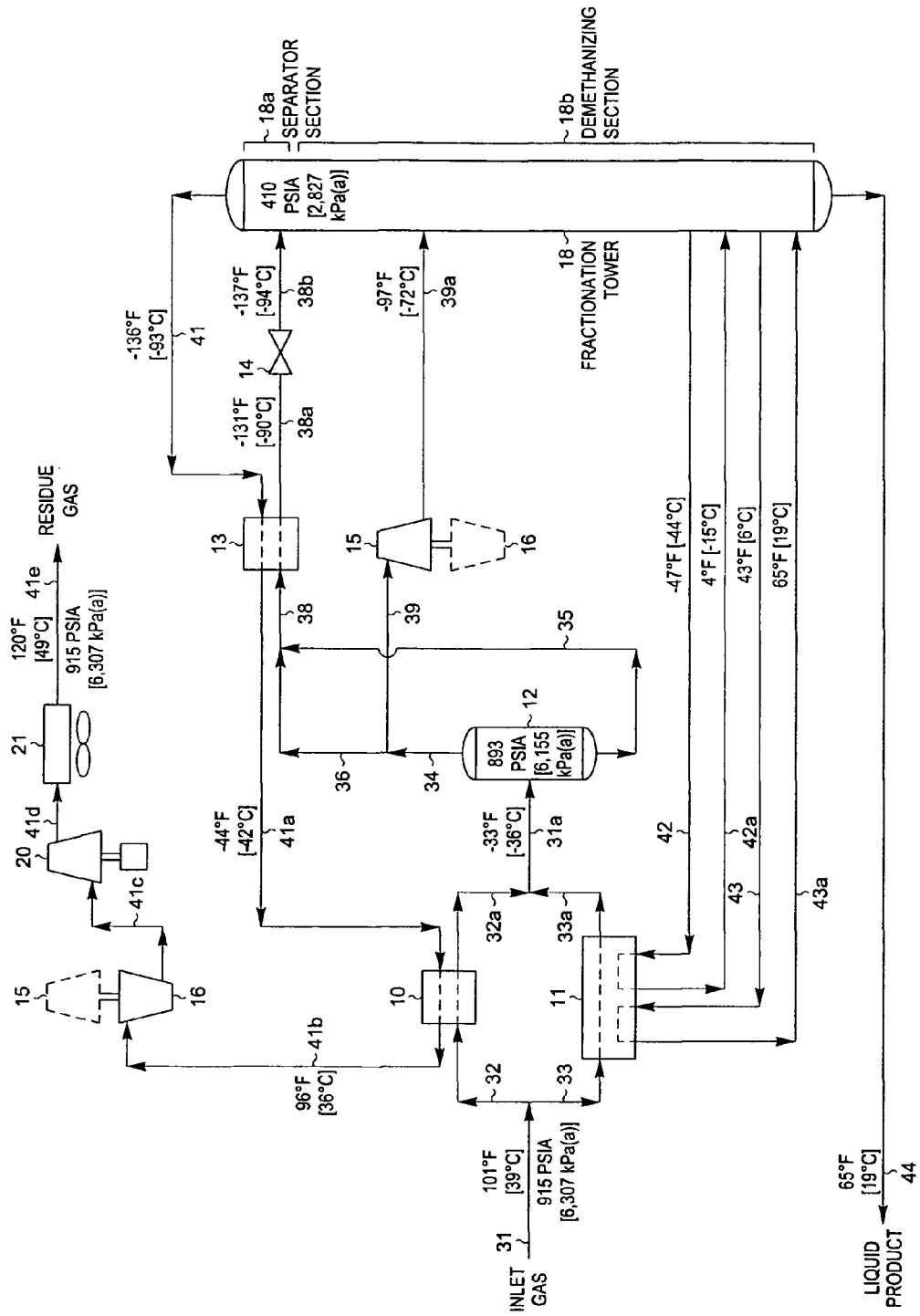

(51) Int. Cl.
*C10G 5/06* (2006.01)
*F25J 5/00* (2006.01)

(52) U.S. Cl.
CPC .............. *F25J 2200/80* (2013.01); *C10G 5/06* (2013.01); *F25J 3/0233* (2013.01); *F25J 3/0238* (2013.01); *F25J 2200/02* (2013.01); *F25J 2200/70* (2013.01); *F25J 2205/04* (2013.01); *F25J 2210/06* (2013.01); *F25J 2240/02* (2013.01); *F25J 2270/12* (2013.01); *F25J 2270/60* (2013.01); *F25J 2290/40* (2013.01); *F25J 2290/42* (2013.01)

(56) References Cited

U.S. PATENT DOCUMENTS

| | | | |
|---|---|---|---|
| 3,292,380 A | 12/1966 | Bucklin | 62/621 |
| 3,477,915 A * | 11/1969 | Gantt et al. | 202/155 |
| 3,508,412 A | 4/1970 | Yearout | |
| 3,516,261 A | 6/1970 | Hoffman | |
| 3,625,017 A | 12/1971 | Hoffman | |
| 3,797,261 A | 3/1974 | Juncker et al. | |
| 3,983,711 A | 10/1976 | Solomon | 62/630 |
| 4,061,481 A | 12/1977 | Campbell et al. | 62/621 |
| 4,127,009 A | 11/1978 | Phillips | |
| 4,140,504 A | 2/1979 | Campbell et al. | 62/621 |
| 4,157,904 A | 6/1979 | Campbell et al. | 62/623 |
| 4,171,964 A | 10/1979 | Campbell et al. | 62/621 |
| 4,185,978 A | 1/1980 | McGalliard et al. | 62/634 |
| 4,251,249 A | 2/1981 | Gulsby | 62/621 |
| 4,278,457 A | 7/1981 | Campbell et al. | 62/621 |
| 4,519,824 A | 5/1985 | Huebel | 62/621 |
| 4,617,039 A | 10/1986 | Buck | 62/621 |
| 4,687,499 A | 8/1987 | Aghili | 62/621 |
| 4,688,399 A | 8/1987 | Reimann | |
| 4,689,063 A | 8/1987 | Paradowski et al. | 62/627 |
| 4,690,702 A | 9/1987 | Paradowski et al. | 62/621 |
| 4,854,955 A | 8/1989 | Campbell et al. | 62/621 |
| 4,869,740 A | 9/1989 | Campbell et al. | 62/621 |
| 4,889,545 A | 12/1989 | Campbell et al. | 62/621 |
| 5,255,528 A | 10/1993 | Dao | |
| 5,275,005 A | 1/1994 | Campbell et al. | 62/621 |
| 5,282,507 A | 2/1994 | Tongu et al. | |
| 5,316,628 A | 5/1994 | Collin et al. | |
| 5,335,504 A | 8/1994 | Durr et al. | 62/632 |
| 5,339,654 A | 8/1994 | Cook et al. | |
| 5,367,884 A | 11/1994 | Phillips et al. | |
| 5,410,885 A | 5/1995 | Smolarek et al. | |
| 5,555,748 A | 9/1996 | Campbell et al. | 62/621 |
| 5,566,554 A | 10/1996 | Vijayaraghavan et al. | 62/621 |
| 5,568,737 A * | 10/1996 | Campbell et al. | 62/621 |
| 5,675,054 A | 10/1997 | Manley et al. | |
| 5,685,170 A | 11/1997 | Sorensen | |
| 5,713,216 A | 2/1998 | Erickson | |
| 5,771,712 A | 6/1998 | Campbell et al. | 62/621 |
| 5,799,507 A | 9/1998 | Wilkinson et al. | 62/621 |
| 5,881,569 A | 3/1999 | Campbell et al. | 62/621 |
| 5,890,377 A | 4/1999 | Foglietta | |
| 5,890,378 A | 4/1999 | Rambo et al. | 62/621 |
| 5,983,664 A | 11/1999 | Campbell et al. | 62/621 |
| 6,182,469 B1 | 2/2001 | Campbell et al. | 62/621 |
| 6,361,582 B1 | 3/2002 | Pinnau et al. | |
| 6,516,631 B1 | 2/2003 | Trebble | 62/630 |
| 6,565,626 B1 | 5/2003 | Baker et al. | |
| 6,578,379 B2 | 6/2003 | Paradowski | 62/622 |
| 6,694,775 B1 | 2/2004 | Higginbotham et al. | |
| 6,712,880 B2 | 3/2004 | Foglietta et al. | 95/184 |
| 6,915,662 B2 | 7/2005 | Wilkinson et al. | 62/621 |
| 7,165,423 B2 | 1/2007 | Winningham | 62/620 |
| 7,191,617 B2 * | 3/2007 | Cuellar et al. | 62/628 |
| 7,210,311 B2 | 5/2007 | Wilkinson | 62/611 |
| 7,219,513 B1 | 5/2007 | Mostafa | 62/620 |
| 7,310,971 B2 * | 12/2007 | Eaton et al. | 62/613 |
| 2002/0166336 A1 | 11/2002 | Wilkinson et al. | |
| 2004/0079107 A1 | 4/2004 | Wilkinson et al. | |
| 2004/0172967 A1 | 9/2004 | Patel et al. | |
| 2005/0229634 A1 | 10/2005 | Huebel et al. | |
| 2005/0247078 A1 | 11/2005 | Wilkinson et al. | |
| 2005/0268649 A1 | 12/2005 | Wilkinson et al. | 62/613 |
| 2006/0032269 A1 | 2/2006 | Cuellar et al. | 62/620 |
| 2006/0086139 A1 | 4/2006 | Eaton et al. | |
| 2006/0283207 A1 | 12/2006 | Pitman et al. | 62/620 |
| 2008/0000265 A1 | 1/2008 | Cuellar et al. | 62/630 |
| 2008/0078205 A1 | 4/2008 | Cuellar et al. | 62/620 |
| 2008/0190136 A1 | 8/2008 | Pitman et al. | 62/620 |
| 2008/0271480 A1 | 11/2008 | Mak | 62/626 |
| 2009/0100862 A1 | 4/2009 | Wilkinson et al. | 62/620 |
| 2009/0107175 A1 | 4/2009 | Patel et al. | 62/620 |
| 2010/0251764 A1 | 10/2010 | Johnke et al. | 62/620 |
| 2010/0275647 A1 | 11/2010 | Johnke et al. | 62/620 |
| 2010/0287983 A1 | 11/2010 | Johnke et al. | 62/620 |
| 2010/0287984 A1 | 11/2010 | Johnke et al. | 62/620 |
| 2010/0326134 A1 | 12/2010 | Johnke et al. | 62/620 |
| 2011/0226011 A1 | 9/2011 | Johnke et al. | |
| 2011/0226012 A1 | 9/2011 | Johnke et al. | |
| 2011/0226013 A1 | 9/2011 | Johnke et al. | |
| 2011/0226014 A1 | 9/2011 | Johnke et al. | |
| 2011/0232328 A1 | 9/2011 | Johnke et al. | |

OTHER PUBLICATIONS

"Fuel Gas Conditioning Units for Compressor Engines," SME Products Brochure, Gas Processors Assoc. Conference (Apr. 5, 2009).

"P&ID Fuel Gas Conditioner," Drawing No. SMEP-901, Date Drawn: Aug. 29, 2007, SME, available at http://www.sme-llc.com/sme.cfm?a=prd&catID=58&subID=44&prdID=155 (Apr. 24, 2009).

"Fuel Gas Conditioner Preliminary Arrangement," Drawing No. SMP-1007-00, Date Drawn: Nov. 11, 2008, SME, available at http://www.sme-llc.com/sme.cfm?a=prd&catID=58&subID=44&prdID=155 (Apr. 24, 2009).

"Product: Fuel Gas Conditioning Units," SME Associates, LLC, available at http://www.sme-llc.com/sme.cfm?a=prd&catID=58&subID=44&prdID=155 (Apr. 24, 2009).

Mowrey, E. Ross., "Efficient, High Recovery of Liquids from Natural Gas Utilizing a High Pressure Absorber," Proceedings of the Eighty-First Annual Convention of the Gas Processors Association, Dallas, Texas, Mar. 11-13, 2002—10 pages.

International Search Report and Written Opinion issued in International Application No. PCT/US2010/26185 dated Jul. 9, 2010—20 pages.

International Search Report and Written Opinion issued in International Application No. PCT/US2010/29331 dated Jul. 2, 2010—15 pages.

International Search Report and Written Opinion issued in International Application No. PCT/US2010/33374 dated Jul. 9, 2010—18 pages.

International Search Report and Written Opinion issued in International Application No. PCT/US2010/35121 dated Jul. 19, 2010—18 pages.

International Search Report and Written Opinion issued in International Application No. PCT/US2010/37098 dated Aug. 17, 2010—12 pages.

International Search Report and Written Opinion issued in International Application No. PCT/US2011/028872 dated May 18, 2011—6 pages.

International Search Report and Written Opinion issued in International Application No. PCT/US2011/29234 dated May 20, 2011—29 pages.

International Search Report and Written Opinion issued in International Application No. PCT/US2011/029034 dated Jul. 27, 2011—39 pages.

International Search Report and Written Opinion issued in International Application No. PCT/US2011/029409 dated May 17, 2011—14 pages.

International Search Report and Written Opinion issued in International Application No. PCT/US2011/029239 dated May 20, 2011—20 pages.

(56) References Cited

OTHER PUBLICATIONS

PCT Notification of Transmittal of the International Search Report and the Written Opinion of the International Searching Authority, or the Declaration (Form PCT/ISA/220); PCT International Search Report (Form PCT/ISA/210); PCT Written Opinion of the International Searching Authority (Form PCT/ISA/237)—20 pages.

Office Action issued in U.S. Appl. No. 13/052,348, dated Dec. 17, 2014 (13 pages).

Office Action issued in U.S. Appl. No. 13/051,682, dated Dec. 18, 2014 (13 pages).

Office Action issued in U.S. Appl. No. 13/053,792, dated Dec. 18, 2014 (20 pages).

Office Action issued in U.S. Appl. No. 13/052,575, dated Dec. 16, 2014 (16 pages).

* cited by examiner

HYDROCARBON GAS PROCESSING

This invention relates to a process and apparatus for the separation of a gas containing hydrocarbons. The applicants claim the benefits under Title 35, United States Code, Section 119(e) of prior U.S. Provisional Application No. 61/186,361 which was filed on Jun. 11, 2009. The applicants also claim the benefits under Title 35, United States Code, Section 120 as a continuation-in-part of U.S. patent application Ser. No. 12/372,604 which was filed on Feb. 17, 2009. Assignees SME Associates, Inc. and Ortloff Engineers, Ltd. were parties to a joint research agreement that was in effect before the invention of this application was made.

BACKGROUND OF THE INVENTION

Ethylene, ethane, propylene, propane, and/or heavier hydrocarbons can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, i.e., methane and ethane together comprise at least 50 mole percent of the gas. The gas also contains relatively lesser amounts of heavier hydrocarbons such as propane, butanes, pentanes, and the like, as well as hydrogen, nitrogen, carbon dioxide, and other gases.

The present invention is generally concerned with the recovery of ethylene, ethane, propylene, propane, and heavier hydrocarbons from such gas streams. A typical analysis of a gas stream to be processed in accordance with this invention would be, in approximate mole percent, 90.0% methane, 4.0% ethane and other $C_2$ components, 1.7% propane and other $C_3$ components, 0.3% iso-butane, 0.5% normal butane, and 0.8% pentanes plus, with the balance made up of nitrogen and carbon dioxide. Sulfur containing gases are also sometimes present.

The historically cyclic fluctuations in the prices of both natural gas and its natural gas liquid (NGL) constituents have at times reduced the incremental value of ethane, ethylene, propane, propylene, and heavier components as liquid products. This has resulted in a demand for processes that can provide more efficient recoveries of these products and for processes that can provide efficient recoveries with lower capital investment. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas being processed. Depending upon the pressure of the gas source, the richness (ethane, ethylene, and heavier hydrocarbons content) of the gas, and the desired end products, each of these processes or a combination thereof may be employed.

The cryogenic expansion process is now generally preferred for natural gas liquids recovery because it provides maximum simplicity with ease of startup, operating flexibility, good efficiency, safety, and good reliability. U.S. Pat. Nos. 3,292,380; 4,061,481; 4,140,504; 4,157,904; 4,171,964; 4,185,978; 4,251,249; 4,278,457; 4,519,824; 4,617,039; 4,687,499; 4,689,063; 4,690,702; 4,854,955; 4,869,740; 4,889,545; 5,275,005; 5,555,748; 5,566,554; 5,568,737; 5,771,712; 5,799,507; 5,881,569; 5,890,378; 5,983,664; 6,182,469; 6,578,379; 6,712,880; 6,915,662; 7,191,617; 7,219,513; reissue U.S. Pat. No. 33,408; and co-pending application Ser. Nos. 11/430,412; 11/839,693; 11/971,491; and 12/206,230 describe relevant processes (although the description of the present invention in some cases is based on different processing conditions than those described in the cited U.S. patents).

In a typical cryogenic expansion recovery process, a feed gas stream under pressure is cooled by heat exchange with other streams of the process and/or external sources of refrigeration such as a propane compression-refrigeration system. As the gas is cooled, liquids may be condensed and collected in one or more separators as high-pressure liquids containing some of the desired $C_2$+ components. Depending on the richness of the gas and the amount of liquids formed, the high-pressure liquids may be expanded to a lower pressure and fractionated. The vaporization occurring during expansion of the liquids results in further cooling of the stream. Under some conditions, pre-cooling the high pressure liquids prior to the expansion may be desirable in order to further lower the temperature resulting from the expansion. The expanded stream, comprising a mixture of liquid and vapor, is fractionated in a distillation (demethanizer or deethanizer) column. In the column, the expansion cooled stream(s) is (are) distilled to separate residual methane, nitrogen, and other volatile gases as overhead vapor from the desired $C_2$ components, $C_3$ components, and heavier hydrocarbon components as bottom liquid product, or to separate residual methane, $C_2$ components, nitrogen, and other volatile gases as overhead vapor from the desired $C_3$ components and heavier hydrocarbon components as bottom liquid product.

If the feed gas is not totally condensed (typically it is not), the vapor remaining from the partial condensation can be split into two streams. One portion of the vapor is passed through a work expansion machine or engine, or an expansion valve, to a lower pressure at which additional liquids are condensed as a result of further cooling of the stream. The pressure after expansion is essentially the same as the pressure at which the distillation column is operated. The combined vapor-liquid phases resulting from the expansion are supplied as feed to the column.

The remaining portion of the vapor is cooled to substantial condensation by heat exchange with other process streams, e.g., the cold fractionation tower overhead. Some or all of the high-pressure liquid may be combined with this vapor portion prior to cooling. The resulting cooled stream is then expanded through an appropriate expansion device, such as an expansion valve, to the pressure at which the demethanizer is operated. During expansion, a portion of the liquid will vaporize, resulting in cooling of the total stream. The flash expanded stream is then supplied as top feed to the demethanizer. Typically, the vapor portion of the flash expanded stream and the demethanizer overhead vapor combine in an upper separator section in the fractionation tower as residual methane product gas. Alternatively, the cooled and expanded stream may be supplied to a separator to provide vapor and liquid streams. The vapor is combined with the tower overhead and the liquid is supplied to the column as a top column feed.

The present invention employs a novel means of performing the various steps described above more efficiently and using fewer pieces of equipment. This is accomplished by combining what heretofore have been individual equipment items into a common housing, thereby reducing the plot space required for the processing plant and reducing the capital cost of the facility. Surprisingly, applicants have found that the more compact arrangement also significantly reduces the power consumption required to achieve a given recovery level, thereby increasing the process efficiency and reducing the operating cost of the facility. In addition, the more compact arrangement also eliminates much of the piping used to interconnect the individual equipment items in traditional plant designs, further reducing capital cost and also eliminating the associated flanged piping connections. Since piping flanges are a potential leak source for hydrocarbons (which are volatile organic compounds, VOCs, that contribute to greenhouse gases and may also be precursors to atmospheric ozone formation), eliminating these flanges reduces the potential for atmospheric emissions that can damage the environment.

In accordance with the present invention, it has been found that $C_2$ recoveries in excess of 88% can be obtained. Similarly, in those instances where recovery of $C_2$ components is not desired, $C_3$ recoveries in excess of 93% can be maintained. In addition, the present invention makes possible essentially 100% separation of methane (or $C_2$ components) and lighter components from the $C_2$ components (or $C_3$ components) and heavier components at lower energy requirements compared to the prior art while maintaining the same recovery level. The present invention, although applicable at lower pressures and warmer temperatures, is particularly advantageous when processing feed gases in the range of 400 to 1500 psia [2,758 to 10,342 kPa(a)] or higher under conditions requiring NGL recovery column overhead temperatures of −50° F. [−46° C.] or colder.

Figure 2:
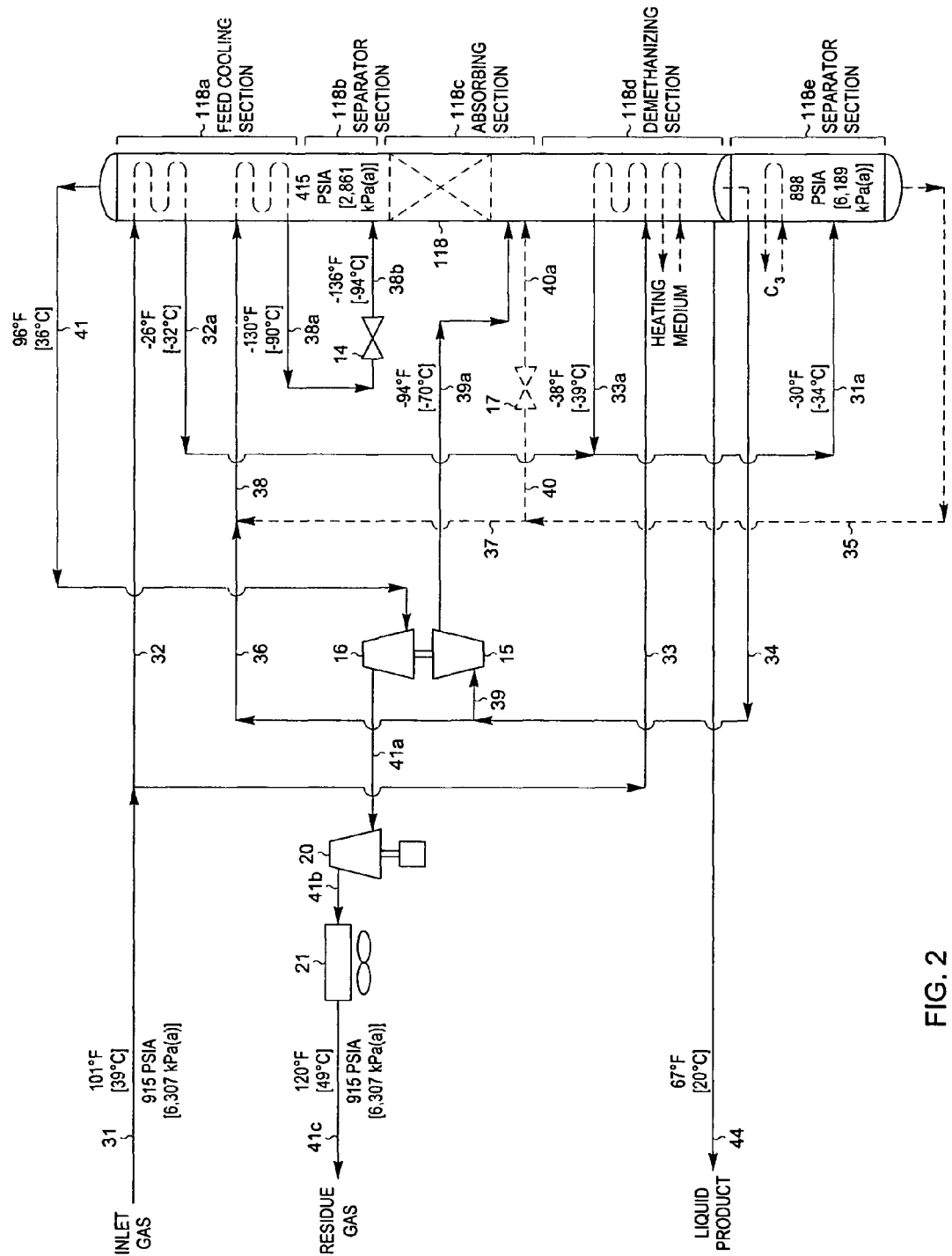

For a better understanding of the present invention, reference is made to the following examples and drawings. Referring to the drawings:

FIG. 1 is a flow diagram of a prior art natural gas processing plant in accordance with U.S. Pat. No. 4,157,904;

FIG. 2 is a flow diagram of a natural gas processing plant in accordance with the present invention; and FIGS. 3 through 9 are flow diagrams illustrating alternative means of application of the present invention to a natural gas stream.

In the following explanation of the above figures, tables are provided summarizing flow rates calculated for representative process conditions. In the tables appearing herein, the values for flow rates (in moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

For convenience, process parameters are reported in both the traditional British units and in the units of the Système International d'Unités (SI). The molar flow rates given in the tables may be interpreted as either pound moles per hour or kilogram moles per hour. The energy consumptions reported as horsepower (HP) and/or thousand British Thermal Units per hour (MBTU/Hr) correspond to the stated molar flow rates in pound moles per hour. The energy consumptions reported as kilowatts (kW) correspond to the stated molar flow rates in kilogram moles per hour.

DESCRIPTION OF THE PRIOR ART

FIG. 1 is a process flow diagram showing the design of a processing plant to recover $C_2$+ components from natural gas using prior art according to U.S. Pat. No. 4,157,904. In this simulation of the process, inlet gas enters the plant at 101° F. [39° C.] and 915 psia [6,307 kPa(a)] as stream 31. If the inlet gas contains a concentration of sulfur compounds which would prevent the product streams from meeting specifications, the sulfur compounds are removed by appropriate pretreatment of the feed gas (not illustrated). In addition, the feed stream is usually dehydrated to prevent hydrate (ice) formation under cryogenic conditions. Solid desiccant has typically been used for this purpose.

The feed stream 31 is divided into two portions, streams 32 and 33. Stream 32 is cooled to −31° F. [−35° C.] in heat exchanger 10 by heat exchange with cool residue gas (stream 41a), while stream 33 is cooled to −37° F. [−38° C.] in heat exchanger 11 by heat exchange with demethanizer reboiler liquids at 43° F. [6° C.] (stream 43) and side reboiler liquids at −47° F. [−44° C.](stream 42). Streams 32a and 33a recombine to form stream 31a, which enters separator 12 at −33° F. [−36° C.] and 893 psia [6,155 kPa(a)] where the vapor (stream 34) is separated from the condensed liquid (stream 35).

The vapor (stream 34) from separator 12 is divided into two streams, 36 and 39. Stream 36, containing about 32% of the total vapor, is combined with the separator liquid (stream 35), and the combined stream 38 passes through heat exchanger 13 in heat exchange relation with the cold residue gas (stream 41) where it is cooled to substantial condensation. The resulting substantially condensed stream 38a at −131° F. [−90° C.] is then flash expanded through expansion valve 14 to the operating pressure (approximately 410 psia [2,827 kPa(a)]) of fractionation tower 18. During expansion a portion of the stream is vaporized, resulting in cooling of the total stream. In the process illustrated in FIG. 1, the expanded stream 38b leaving expansion valve 14 reaches a temperature of −137° F. [−94° C.] and is supplied to separator section 18a in the upper region of fractionation tower 18. The liquids separated therein become the top feed to demethanizing section 18b.

The remaining 68% of the vapor from separator 12 (stream 39) enters a work expansion machine 15 in which mechanical energy is extracted from this portion of the high pressure feed. The machine 15 expands the vapor substantially isentropically to the tower operating pressure, with the work expansion cooling the expanded stream 39a to a temperature of approximately −97° F. [−72° C.]. The typical commercially available expanders are capable of recovering on the order of 80-85% of the work theoretically available in an ideal isentropic expansion. The work recovered is often used to drive a centrifugal compressor (such as item 16) that can be used to re-compress the residue gas (stream 41b), for example. The partially condensed expanded stream 39a is thereafter supplied as feed to fractionation tower 18 at a mid-column feed point.

The demethanizer in tower 18 is a conventional distillation column containing a plurality of vertically spaced trays, one or more packed beds, or some combination of trays and packing. As is often the case in natural gas processing plants, the fractionation tower may consist of two sections. The upper section 18a is a separator wherein the partially vaporized top feed is divided into its respective vapor and liquid portions, and wherein the vapor rising from the lower distillation or demethanizing section 18b is combined with the vapor portion of the top feed to form the cold demethanizer overhead vapor (stream 41) which exits the top of the tower at −136° F. [−93° C.]. The lower, demethanizing section 18b contains the trays and/or packing and provides the necessary contact between the liquids falling downward and the vapors rising upward. The demethanizing section 18b also includes reboilers (such as the reboiler and the side reboiler described previously) which heat and vaporize a portion of the liquids flowing down the column to provide the stripping vapors which flow up the column to strip the liquid product, stream 44, of methane and lighter components.

The liquid product stream 44 exits the bottom of the tower at 65° F. [19° C.], based on a typical specification of a methane to ethane ratio of 0.010:1 on a mass basis in the bottom product. The residue gas (demethanizer overhead vapor stream 41) passes countercurrently to the incoming feed gas in heat exchanger 13 where it is heated to −44° F. [−42° C.] (stream 41a) and in heat exchanger 10 where it is heated to 96° F. [36° C.] (stream 41b). The residue gas is then re-compressed in two stages. The first stage is compressor 16 driven by expansion machine 15. The second stage is compressor 20 driven by a supplemental power source which compresses the residue gas (stream 41d) to sales line pressure. After cooling to 120° F. [49° C.] in discharge cooler 21, the residue gas product (stream 41e) flows to the sales gas pipeline at 915 psia [6,307 kPa(a)], sufficient to meet line requirements (usually on the order of the inlet pressure).

A summary of stream flow rates and energy consumption for the process illustrated in FIG. 1 is set forth in the following table:

TABLE I (FIG. 1)
Stream Flow Summary - Lb. Moles/Hr [kg moles/Hr]

| Stream | Methane | Ethane | Propane | Butanes+ | Total |
|---|---|---|---|---|---|
| 31 | 12,359 | 546 | 233 | 229 | 13,726 |
| 32 | 8,404 | 371 | 159 | 155 | 9,334 |
| 33 | 3,955 | 175 | 74 | 74 | 4,392 |
| 34 | 12,117 | 493 | 172 | 70 | 13,196 |
| 35 | 242 | 53 | 61 | 159 | 530 |
| 36 | 3,829 | 156 | 54 | 22 | 4,170 |
| 38 | 4,071 | 209 | 115 | 181 | 4,700 |
| 39 | 8,288 | 337 | 118 | 48 | 9,026 |
| 41 | 12,350 | 62 | 5 | 1 | 12,620 |
| 44 | 9 | 484 | 228 | 228 | 1,106 |

| Recoveries* | |
|---|---|
| Ethane | 88.54% |
| Propane | 97.70% |
| Butanes+ | 99.65% |
| Power | |
| Residue Gas Compression | 5,174 HP [8,506 kW] |

*(Based on un-rounded flow rates)

DESCRIPTION OF THE INVENTION

FIG. 2 illustrates a flow diagram of a process in accordance with the present invention. The feed gas composition and conditions considered in the process presented in FIG. 2 are the same as those in FIG. 1. Accordingly, the FIG. 2 process can be compared with that of the FIG. 1 process to illustrate the advantages of the present invention.

In the simulation of the FIG. 2 process, inlet gas enters the plant as stream 31 and is divided into two portions, streams 32 and 33. The first portion, stream 32, enters a heat exchange means in the upper region of feed cooling section 118a inside processing assembly 118. This heat exchange means may be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 32 flowing through one pass of the heat exchange means and a distillation vapor stream arising from separator section 118b inside processing assembly 118 that has been heated in a heat exchange means in the lower region of feed cooling section 118a. Stream 32 is cooled while further heating the distillation vapor stream, with stream 32a leaving the heat exchange means at −26° F. [−32° C.].

The second portion, stream 33, enters a heat and mass transfer means in demethanizing section 118d inside processing assembly 118. This heat and mass transfer means may also be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between stream 33 flowing through one pass of the heat and mass transfer means and a distillation liquid stream flowing downward from absorbing section 118c inside processing assembly 118, so that stream 33 is cooled while heating the distillation liquid stream, cooling stream 33a to −38° F. [−39° C.] before it leaves the heat and mass transfer means. As the distillation liquid stream is heated, a portion of it is vaporized to form stripping vapors that rise upward as the remaining liquid continues flowing downward through the heat and mass transfer means. The heat and mass transfer means provides continuous contact between the stripping vapors and the distillation liquid stream so that it also functions to provide mass transfer between the vapor and liquid phases, stripping the liquid product stream 44 of methane and lighter components.

Streams 32a and 33a recombine to form stream 31a, which enters separator section 118e inside processing assembly 118 at −30° F. [−34° C.] and 898 psia [6,189 kPa(a)], whereupon the vapor (stream 34) is separated from the condensed liquid (stream 35). Separator section 118e has an internal head or other means to divide it from demethanizing section 118d, so that the two sections inside processing assembly 118 can operate at different pressures.

The vapor (stream 34) from separator section 118e is divided into two streams, 36 and 39. Stream 36, containing about 32% of the total vapor, is combined with the separated liquid (stream 35, via stream 37), and the combined stream 38 enters a heat exchange means in the lower region of feed cooling section 118a inside processing assembly 118. This heat exchange means may likewise be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 38 flowing through one pass of the heat exchange means and the distillation vapor stream arising from separator section 118b, so that stream 38 is cooled to substantial condensation while heating the distillation vapor stream.

The resulting substantially condensed stream 38a at −130° F. [−90° C.] is then flash expanded through expansion valve 14 to the operating pressure (approximately 415 psia [2,861 kPa(a)]) of absorbing section 118c inside processing assembly 118. During expansion a portion of the stream is vaporized, resulting in cooling of the total stream. In the process illustrated in FIG. 2, the expanded stream 38b leaving expansion valve 14 reaches a temperature of −136° F. [−94° C.] and is supplied to separator section 118b inside processing assembly 118. The liquids separated therein are directed to absorbing section 118c, while the remaining vapors combine with the vapors rising from absorbing section 118c to form the distillation vapor stream that is heated in cooling section 118a.

The remaining 68% of the vapor from separator section 118e (stream 39) enters a work expansion machine 15 in which mechanical energy is extracted from this portion of the high pressure feed. The machine 15 expands the vapor substantially isentropically to the operating pressure of absorbing section 118c, with the work expansion cooling the expanded stream 39a to a temperature of approximately −94° F. [−70° C.]. The partially condensed expanded stream 39a is thereafter supplied as feed to the lower region of absorbing section 118c inside processing assembly 118.

Absorbing section 118c contains a plurality of vertically spaced trays, one or more packed beds, or some combination of trays and packing. The trays and/or packing in absorbing section 118c provide the necessary contact between the vapors rising upward and cold liquid falling downward. The liquid portion of the expanded stream 39a commingles with liquids falling downward from absorbing section 118c and the combined liquid continues downward into demethanizing section 118d. The stripping vapors arising from demethanizing section 118d combine with the vapor portion of the expanded stream 39a and rise upward through absorbing section 118c, to be contacted with the cold liquid falling downward to condense and absorb the $C_2$ components, $C_3$ components, and heavier components from these vapors.

The distillation liquid flowing downward from the heat and mass transfer means in demethanizing section 118d inside processing assembly 118 has been stripped of methane and lighter components. The resulting liquid product (stream 44) exits the lower region of demethanizing section 118d and leaves processing assembly 118 at 67° F. [20° C.]. The distillation vapor stream arising from separator section 118b is warmed in feed cooling section 118a as it provides cooling to streams 32 and 38 as described previously, and the resulting residue gas stream 41 leaves processing assembly 118 at 96° F. [36° C.]. The residue gas is then re-compressed in two stages, compressor 16 driven by expansion machine 15 and compressor 20 driven by a supplemental power source. After stream 41b is cooled to 120° F. [49° C.] in discharge cooler 21, the residue gas product (stream 41c) flows to the sales gas pipeline at 915 psia [6,307 kPa(a)].

A summary of stream flow rates and energy consumption for the process illustrated in FIG. 2 is set forth in the following table:

TABLE II (FIG. 2)
Stream Flow Summary - Lb. Moles/Hr [kg moles/Hr]

| Stream | Methane | Ethane | Propane | Butanes+ | Total |
|---|---|---|---|---|---|
| 31 | 12,359 | 546 | 233 | 229 | 13,726 |
| 32 | 8,651 | 382 | 163 | 160 | 9,608 |
| 33 | 3,708 | 164 | 70 | 69 | 4,118 |
| 34 | 12,139 | 498 | 176 | 74 | 13,234 |
| 35 | 220 | 48 | 57 | 155 | 492 |
| 36 | 3,860 | 158 | 56 | 24 | 4,208 |
| 37 | 220 | 48 | 57 | 155 | 492 |
| 38 | 4,080 | 206 | 113 | 179 | 4,700 |
| 39 | 8,279 | 340 | 120 | 50 | 9,026 |
| 41 | 12,350 | 62 | 5 | 1 | 12,625 |
| 44 | 9 | 484 | 228 | 228 | 1,101 |

Recoveries*

| | |
|---|---|
| Ethane | 88.58% |
| Propane | 97.67% |
| Butanes+ | 99.64% |

Power

| | |
|---|---|
| Residue Gas Compression | 4,829 HP [7,939 kW] |

*(Based on un-rounded flow rates)

A comparison of Tables I and II shows that the present invention maintains essentially the same recoveries as the prior art. However, further comparison of Tables I and II shows that the product yields were achieved using significantly less power than the prior art. In terms of the recovery efficiency (defined by the quantity of ethane recovered per unit of power), the present invention represents nearly a 7% improvement over the prior art of the FIG. 1 process.

The improvement in recovery efficiency provided by the present invention over that of the prior art of the FIG. 1 process is primarily due to two factors. First, the compact arrangement of the heat exchange means in feed cooling section 118a and the heat and mass transfer means in demethanizing section 118d in processing assembly 118 eliminates the pressure drop imposed by the interconnecting piping found in conventional processing plants. The result is that the portion of the feed gas flowing to expansion machine 15 is at higher pressure for the present invention compared to the prior art, allowing expansion machine 15 in the present invention to produce as much power with a higher outlet pressure as expansion machine 15 in the prior art can produce at a lower outlet pressure. Thus, absorbing section 118c in processing assembly 118 of the present invention can operate at higher pressure than fractionation column 18 of the prior art while maintaining the same recovery level. This higher operating pressure, plus the reduction in pressure drop for the residue gas due to eliminating the interconnecting piping, results in a significantly higher pressure for the residue gas entering compressor 20, thereby reducing the power required by the present invention to restore the residue gas to pipeline pressure.

Second, using the heat and mass transfer means in demethanizing section 118d to simultaneously heat the distillation liquid leaving absorbing section 118c while allowing the resulting vapors to contact the liquid and strip its volatile components is more efficient than using a conventional distillation column with external reboilers. The volatile components are stripped out of the liquid continuously, reducing the concentration of the volatile components in the stripping vapors more quickly and thereby improving the stripping efficiency for the present invention.

The present invention offers two other advantages over the prior art in addition to the increase in processing efficiency. First, the compact arrangement of processing assembly 118 of the present invention replaces five separate equipment items in the prior art (heat exchangers 10, 11, and 13; separator 12; and fractionation tower 18 in FIG. 1) with a single equipment item (processing assembly 118 in FIG. 2). This reduces the plot space requirements and eliminates the interconnecting piping, reducing the capital cost of a process plant utilizing the present invention over that of the prior art. Second, elimination of the interconnecting piping means that a processing plant utilizing the present invention has far fewer flanged connections compared to the prior art, reducing the number of potential leak sources in the plant. Hydrocarbons are volatile organic compounds (VOCs), some of which are classified as greenhouse gases and some of which may be precursors to atmospheric ozone formation, which means the present invention reduces the potential for atmospheric releases that can damage the environment.

Other Embodiments

Some circumstances may favor supplying liquid stream 35 directly to the lower region of absorbing section 118c via stream 40 as shown in FIGS. 2, 4, 6, and 8. In such cases, an appropriate expansion device (such as expansion valve 17) is used to expand the liquid to the operating pressure of absorbing section 118c and the resulting expanded liquid stream 40a is supplied as feed to the lower region of absorbing section 118c (as shown by the dashed lines). Some circumstances may favor combining a portion of liquid stream 35 (stream 37) with the vapor in stream 36 (FIGS. 2 and 6) or with cooled second portion 33a (FIGS. 4 and 8) to form combined stream 38 and routing the remaining portion of liquid stream 35 to the lower region of absorbing section 118c via streams 40/40a. Some circumstances may favor combining the expanded liquid stream 40a with expanded stream 39a (FIGS. 2 and 6) or expanded stream 34a (FIGS. 4 and 8) and thereafter supplying the combined stream to the lower region of absorbing section 118c as a single feed.

Figure 3:
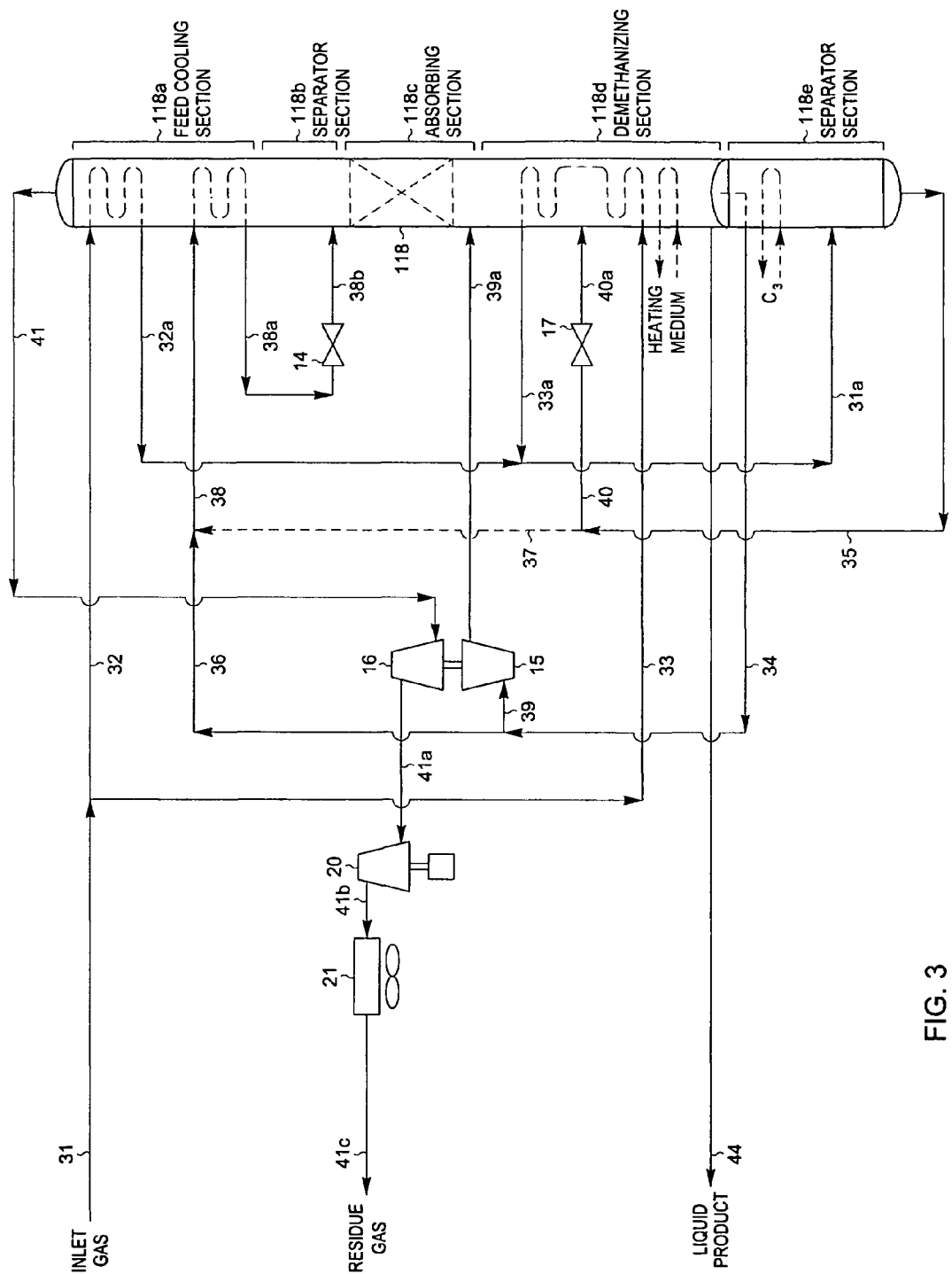
Figure 5:
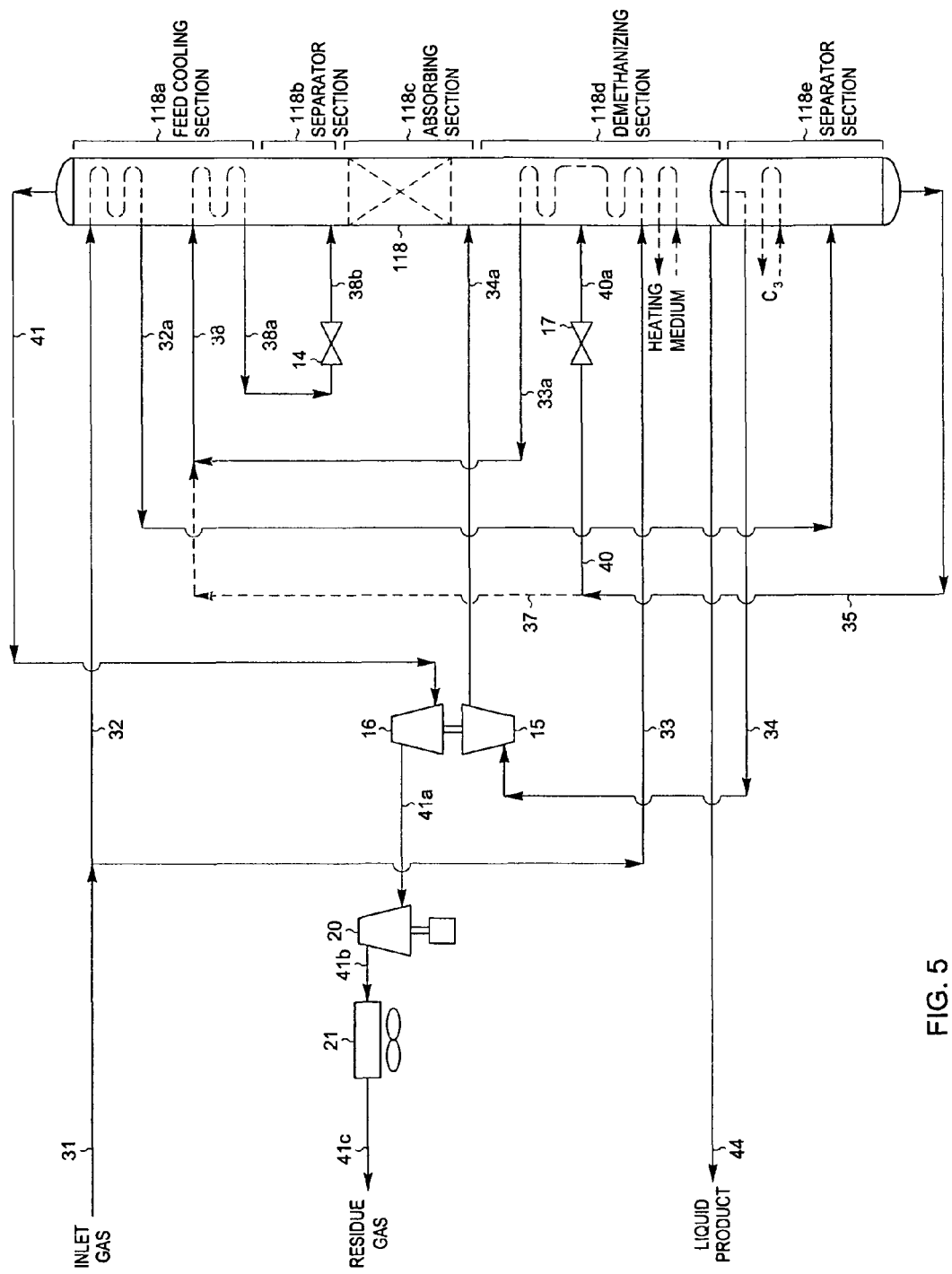
Figure 7:
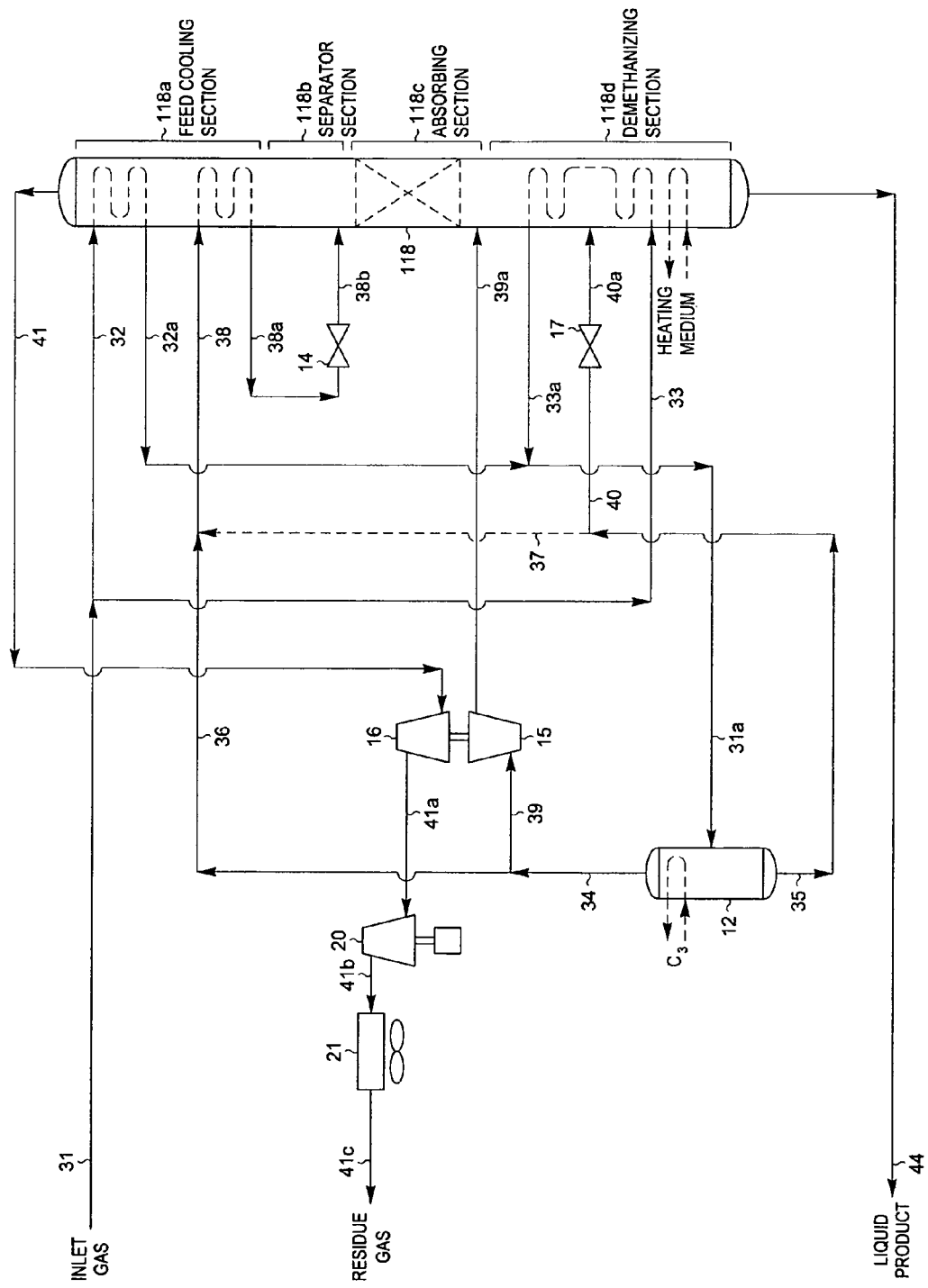
Figure 9:
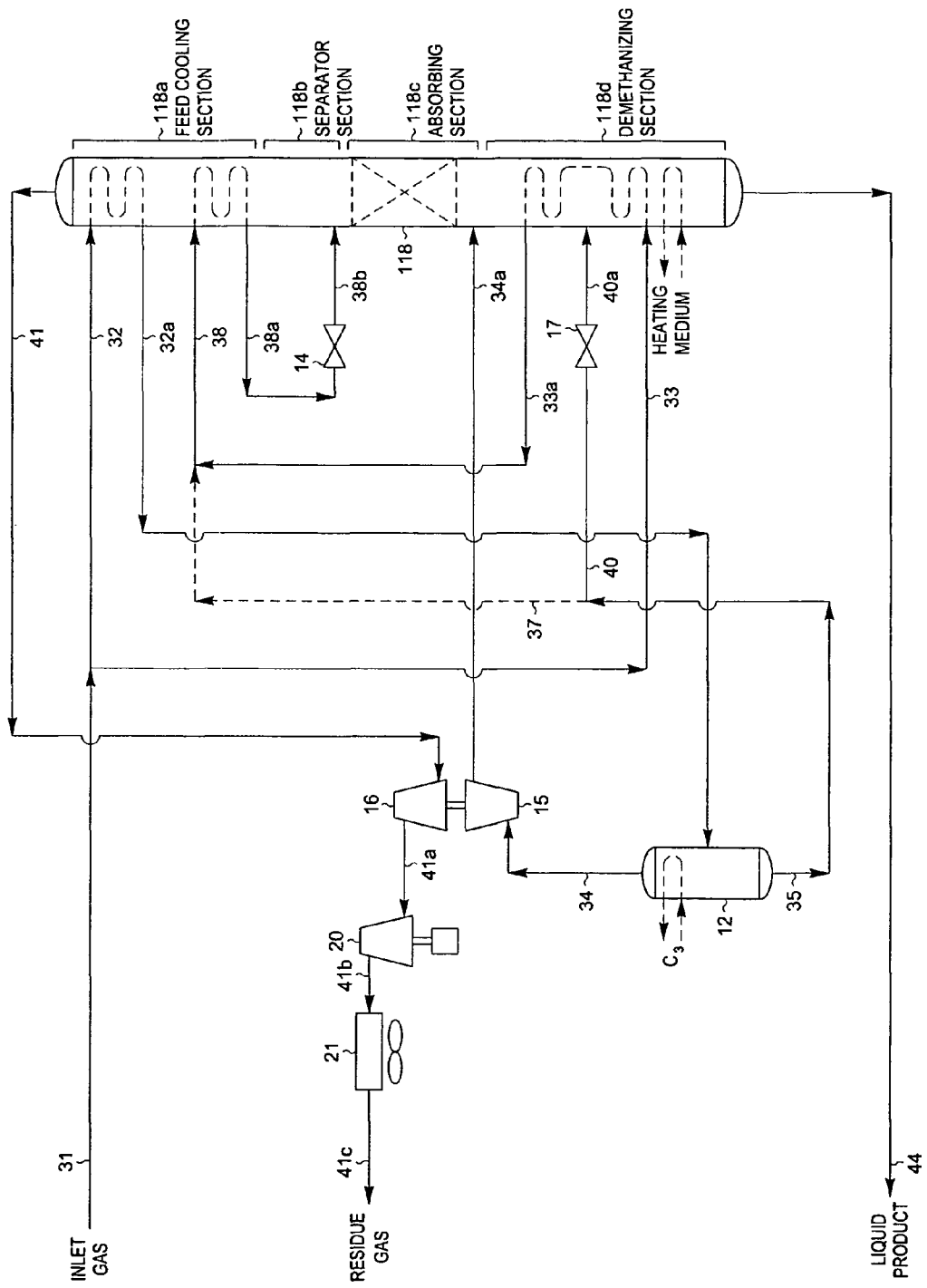

If the feed gas is richer, the quantity of liquid separated in stream 35 may be great enough to favor placing an additional mass transfer zone in demethanizing section 118d between expanded stream 39a and expanded liquid stream 40a as shown in FIGS. 3 and 7, or between expanded stream 34a and expanded liquid stream 40a as shown in FIGS. 5 and 9. In such cases, the heat and mass transfer means in demethanizing section 118d may be configured in upper and lower parts so that expanded liquid stream 40a can be introduced between the two parts. As shown by the dashed lines, some circumstances may favor combining a portion of liquid stream 35 (stream 37) with the vapor in stream 36 (FIGS. 3 and 7) or with cooled second portion 33a (FIGS. 5 and 9) to form combined stream 38, while the remaining portion of liquid stream 35 (stream 40) is expanded to lower pressure and supplied between the upper and lower parts of the heat and mass transfer means in demethanizing section 118d as stream 40a.

Some circumstances may favor not combining the cooled first and second portions (streams 32a and 33a) as shown in FIGS. 4, 5, 8, and 9. In such cases, only the cooled first portion 32a is directed to separator section 118e inside processing assembly 118 (FIGS. 4 and 5) or separator 12 (FIGS. 8 and 9) where the vapor (stream 34) is separated from the condensed liquid (stream 35). Vapor stream 34 enters work expansion machine 15 and is expanded substantially isentropically to the operating pressure of absorbing section 118c, whereupon expanded stream 34a is supplied as feed to the lower region of absorbing section 118c inside processing assembly 118. The cooled second portion 33a is combined with the separated liquid (stream 35, via stream 37), and the combined stream 38 is directed to the heat exchange means in the lower region of feed cooling section 118a inside processing assembly 118 and cooled to substantial condensation. The substantially condensed stream 38a is flash expanded through expansion valve 14 to the operating pressure of absorbing section 118c, whereupon expanded stream 38b is supplied to separator section 118b inside processing assembly 118. Some circumstances may favor combining only a portion (stream 37) of liquid stream 35 with the cooled second portion 33a, with the remaining portion (stream 40) supplied to the lower region of absorbing section 118c via expansion valve 17. Other circumstances may favor sending all of liquid stream 35 to the lower region of absorbing section 118c via expansion valve 17.

Figure 6:
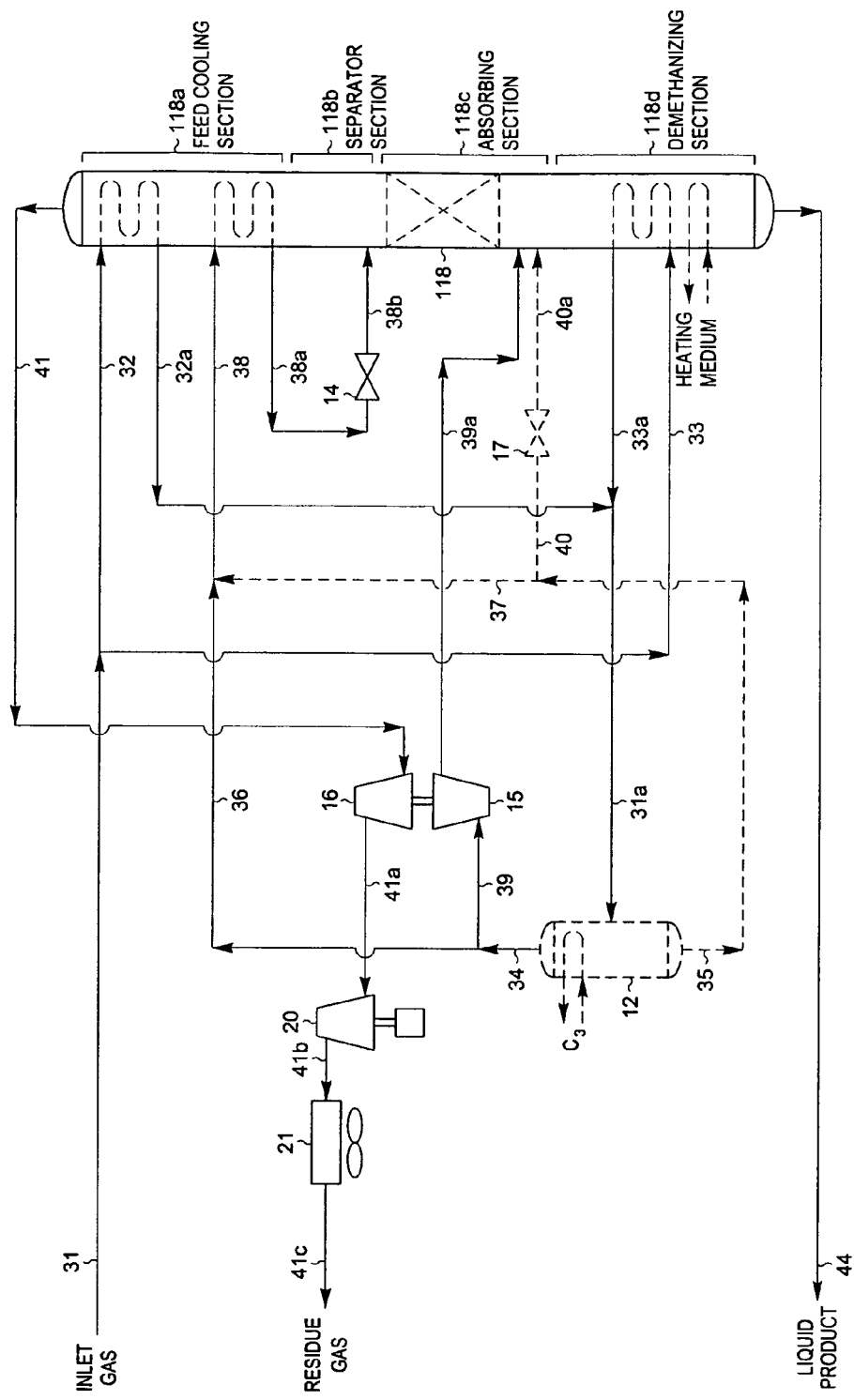

In some circumstances, it may be advantageous to use an external separator vessel to separate cooled feed stream 31a or cooled first portion 32a, rather than including separator section 118e in processing assembly 118. As shown in FIGS. 6 and 7, separator 12 can be used to separate cooled feed stream 31a into vapor stream 34 and liquid stream 35. Likewise, as shown in FIGS. 8 and 9, separator 12 can be used to separate cooled first portion 32a into vapor stream 34 and liquid stream 35.

Figure 4:
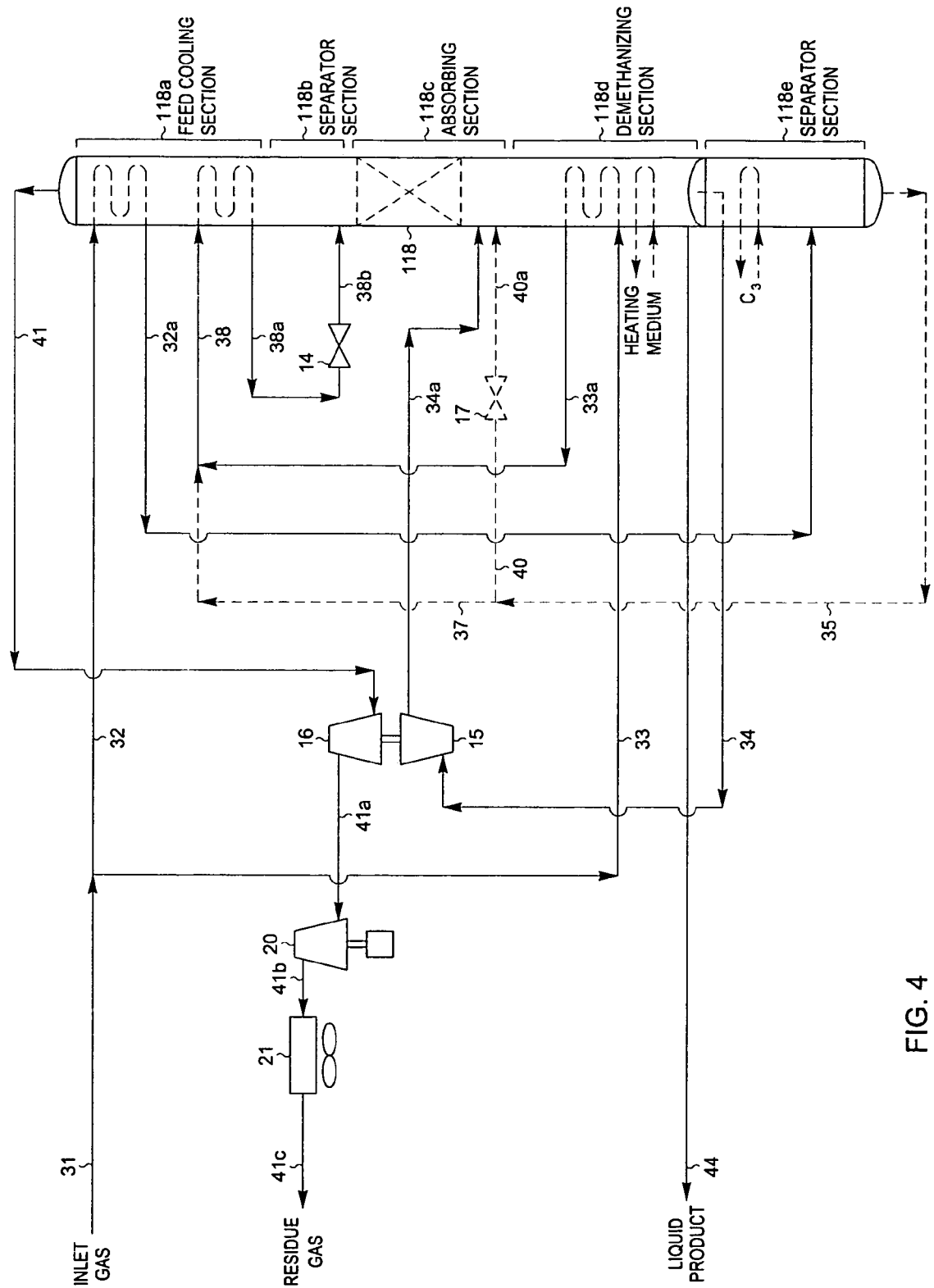
Figure 8:
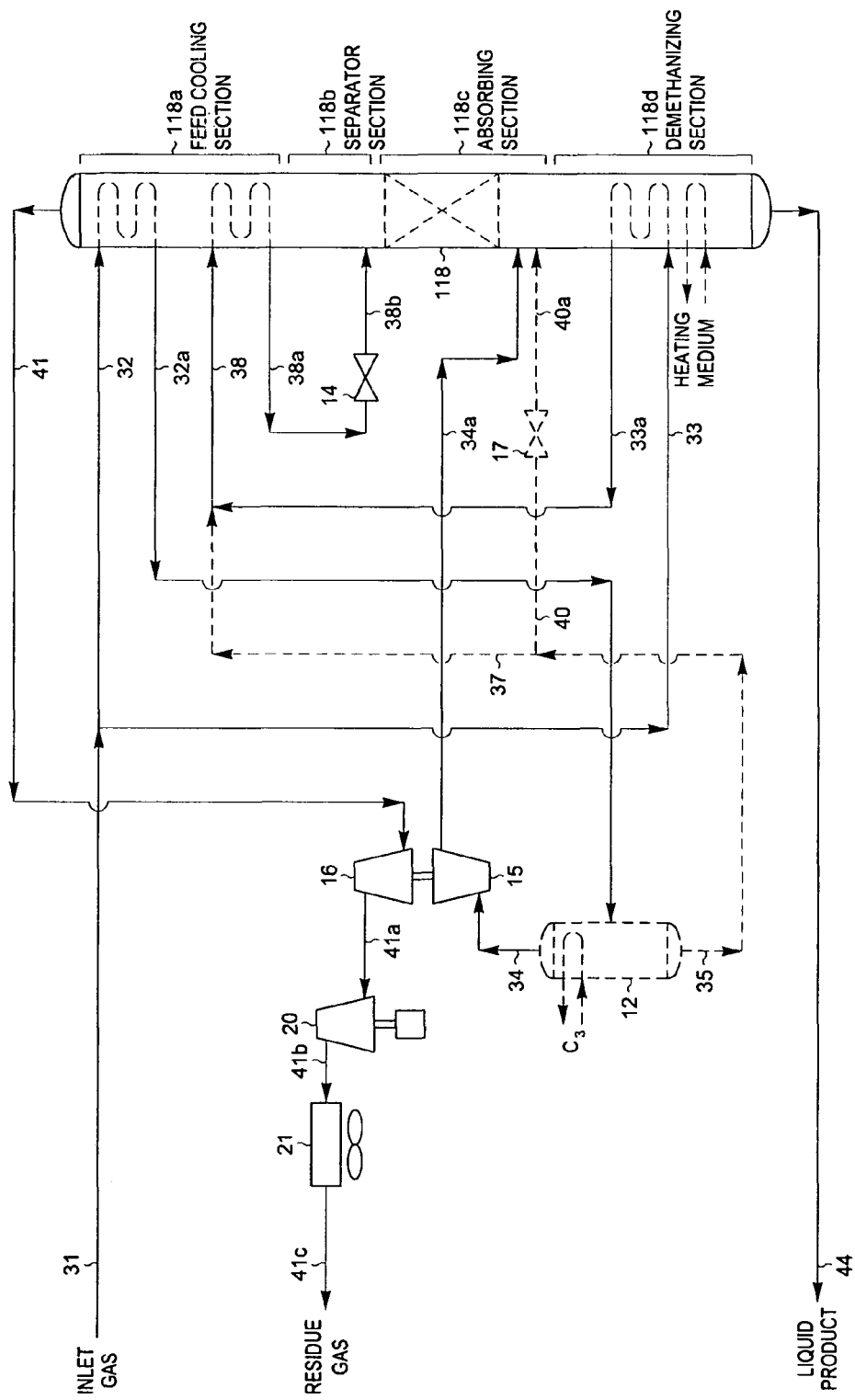

Depending on the quantity of heavier hydrocarbons in the feed gas and the feed gas pressure, the cooled feed stream 31a entering separator section 118e in FIGS. 2 and 3 or separator 12 in FIGS. 6 and 7 (or the cooled first portion 32a entering separator section 118e in FIGS. 4 and 5 or separator 12 in FIGS. 8 and 9) may not contain any liquid (because it is above its dewpoint, or because it is above its cricondenbar). In such cases, there is no liquid in streams 35 and 37 (as shown by the dashed lines), so only the vapor from separator section 118e in stream 36 (FIGS. 2 and 3), the vapor from separator 12 in stream 36 (FIGS. 6 and 7), or the cooled second portion 33a (FIGS. 4, 5, 8, and 9) flows to stream 38 to become the expanded substantially condensed stream 38b supplied to separator section 118b in processing assembly 118. In such circumstances, separator section 118e in processing assembly 118 (FIGS. 2 through 5) or separator 12 (FIGS. 6 through 9) may not be required.

Feed gas conditions, plant size, available equipment, or other factors may indicate that elimination of work expansion machine 15, or replacement with an alternate expansion device (such as an expansion valve), is feasible. Although individual stream expansion is depicted in particular expansion devices, alternative expansion means may be employed where appropriate. For example, conditions may warrant work expansion of the substantially condensed portion of the feed stream (stream 38a).

In accordance with the present invention, the use of external refrigeration to supplement the cooling available to the inlet gas from the distillation vapor and liquid streams may be employed, particularly in the case of a rich inlet gas. In such cases, a heat and mass transfer means may be included in separator section 118e (or a gas collecting means in such cases when the cooled feed stream 31a or the cooled first portion 32a contains no liquid) as shown by the dashed lines in FIGS. 2 through 5, or a heat and mass transfer means may be included in separator 12 as shown by the dashed lines in FIGS. 6 though 9. This heat and mass transfer means may be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between a refrigerant stream (e.g., propane) flowing through one pass of the heat and mass transfer means and the vapor portion of stream 31a (FIGS. 2, 3, 6, and 7) or stream 32a (FIGS. 4, 5, 8, and 9) flowing upward, so that the refrigerant further cools the vapor and condenses additional liquid, which falls downward to become part of the liquid removed in stream 35. Alternatively, conventional gas chiller(s) could be used to cool stream 32a, stream 33a, and/or stream 31a with refrigerant before stream 31a enters separator section 118e (FIGS. 2 and 3) or separator 12 (FIGS. 6 and 7) or stream 32a enters separator section 118e (FIGS. 4 and 5) or separator 12 (FIGS. 8 and 9).

Depending on the temperature and richness of the feed gas and the amount of $C_2$ components to be recovered in liquid product stream 44, there may not be sufficient heating available from stream 33 to cause the liquid leaving demethanizing section 118d to meet the product specifications. In such cases, the heat and mass transfer means in demethanizing section 118d may include provisions for providing supplemental heating with heating medium as shown by the dashed lines in FIGS. 2 through 9. Alternatively, another heat and mass transfer means can be included in the lower region of demethanizing section 118d for providing supplemental heating, or stream 33 can be heated with heating medium before it is supplied to the heat and mass transfer means in demethanizing section 118d.

Depending on the type of heat transfer devices selected for the heat exchange means in the upper and lower regions of feed cooling section 118*a*, it may be possible to combine these heat exchange means in a single multi-pass and/or multi-service heat transfer device. In such cases, the multi-pass and/or multi-service heat transfer device will include appropriate means for distributing, segregating, and collecting stream 32, stream 38, and the distillation vapor stream in order to accomplish the desired cooling and heating.

Some circumstances may favor providing additional mass transfer in the upper region of demethanizing section 118*d*. In such cases, a mass transfer means can be located below where expanded stream 39*a* (FIGS. 2, 3, 6, and 7) or expanded stream 34*a* (FIGS. 4, 5, 8, and 9) enters the lower region of absorbing section 118*c* and above where cooled second portion 33*a* leaves the heat and mass transfer means in demethanizing section 118*d*.

A less preferred option for the FIGS. 2, 3, 6, and 7 embodiments of the present invention is providing a separator vessel for cooled first portion 32*a*, a separator vessel for cooled second portion 33*a*, combining the vapor streams separated therein to form vapor stream 34, and combining the liquid streams separated therein to form liquid stream 35. Another less preferred option for the present invention is cooling stream 37 in a separate heat exchange means inside feed cooling section 118*a* (rather than combining stream 37 with stream 36 or stream 33*a* to form combined stream 38), expanding the cooled stream in a separate expansion device, and supplying the expanded stream to an intermediate region in absorbing section 118*c*.

It will be recognized that the relative amount of feed found in each branch of the split vapor feed will depend on several factors, including gas pressure, feed gas composition, the amount of heat which can economically be extracted from the feed, and the quantity of horsepower available. More feed above absorbing section 118*c* may increase recovery while decreasing power recovered from the expander and thereby increasing the recompression horsepower requirements. Increasing feed below absorbing section 118*c* reduces the horsepower consumption but may also reduce product recovery.

The present invention provides improved recovery of $C_2$ components, $C_3$ components, and heavier hydrocarbon components or of $C_3$ components and heavier hydrocarbon components per amount of utility consumption required to operate the process. An improvement in utility consumption required for operating the process may appear in the form of reduced power requirements for compression or re-compression, reduced power requirements for external refrigeration, reduced energy requirements for supplemental heating, or a combination thereof.

While there have been described what are believed to be preferred embodiments of the invention, those skilled in the art will recognize that other and further modifications may be made thereto, e.g. to adapt the invention to various conditions, types of feed, or other requirements without departing from the spirit of the present invention as defined by the following claims.

We claim:

1. A process for the separation of a gas stream containing methane, $C_2$ components, $C_3$ components, and heavier hydrocarbon components into a volatile residue gas fraction and a relatively less volatile fraction containing a major portion of said $C_2$ components, $C_3$ components, and heavier hydrocarbon components or said $C_3$ components and heavier hydrocarbon components wherein (1) said gas stream is divided into first and second portions;
(2) said first portion is cooled;
(3) said second portion is cooled;
(4) said cooled first portion is combined with said cooled second portion to form a cooled gas stream;
(5) said cooled gas stream is divided into first and second streams;
(6) said first stream is cooled to condense substantially all of said first stream and is thereafter expanded to lower pressure whereby said first stream is further cooled;
(7) said expanded cooled first stream is supplied as a top feed to an absorbing means housed in a single equipment item processing assembly;
(8) said second stream is expanded to said lower pressure and is supplied as a bottom feed to said absorbing means;
(9) a distillation vapor stream is collected from an upper region of said absorbing means and heated in one or more heat exchange means housed in said processing assembly, thereby to supply at least a portion of the cooling of steps (2) and (6), and thereafter discharging said heated distillation vapor stream from said processing assembly as said volatile residue gas fraction;
(10) a distillation liquid stream is collected from a lower region of said absorbing means and heated in a heat and mass transfer means housed in said processing assembly, thereby to supply at least a portion of the cooling of step (3) while simultaneously stripping the more volatile components from said distillation liquid stream, and thereafter discharging said heated and stripped distillation liquid stream from said processing assembly as said relatively less volatile fraction; and
(11) the quantities and temperatures of said feed streams to said absorbing means are effective to maintain the temperature of said upper region of said absorbing means at a temperature whereby the major portions of the components in said relatively less volatile fraction are recovered.

2. The process according to claim 1 wherein
(a) said cooled first portion is combined with said cooled second portion to form a partially condensed gas stream;
(b) said partially condensed gas stream is supplied to a separating means and is separated therein to provide a vapor stream and at least one liquid stream;
(c) said vapor stream is divided into said first and second streams; and
(d) at least a portion of said at least one liquid stream is expanded to said lower pressure and is supplied as an additional bottom feed to said absorbing means.

3. The process according to claim 2 wherein
(a) said first stream is combined with at least a portion of said at least one liquid stream to form a combined stream;
(b) said combined stream is cooled to condense substantially all of said combined stream and is thereafter expanded to lower pressure whereby said combined stream is further cooled;
(c) said expanded cooled combined stream is supplied as said top feed to said absorbing means;
(d) any remaining portion of said at least one liquid stream is expanded to said lower pressure and is supplied as said additional bottom feed to said absorbing means; and
(e) said distillation vapor stream is heated in said one or more heat exchange means housed in said processing assembly, thereby to supply at least a portion of the cooling of steps (a) and (b).

4. The process according to claim 1 wherein
(a) said first portion is cooled and is thereafter expanded to said lower pressure;
(b) said expanded cooled first portion is supplied as said bottom feed to said absorbing means;
(c) said second portion is cooled to condense substantially all of said second portion and is thereafter expanded to said lower pressure whereby said second portion is further cooled;
(d) said expanded cooled second portion is supplied as said top feed to said absorbing means;
(e) said distillation vapor stream is collected from said upper region of said absorbing means and heated in said one or more heat exchange means, thereby to supply at least a portion of cooling of steps (a) and (c); and
(d) said distillation liquid stream is collected from said lower region of said absorbing means and heated in said heat and mass transfer means, thereby to supply at least a portion of the cooling of step (c).

5. The process according to claim 4 wherein
(a) said first portion is cooled sufficiently to partially condense said first portion;
(b) said partially condensed first portion is supplied to a separating means and is separated therein to provide a vapor stream and at least one liquid stream;
(c) said vapor stream is expanded to lower pressure and is supplied as said bottom feed to said absorbing means; and
(d) at least a portion of said at least one liquid stream is expanded to said lower pressure and is supplied as an additional bottom feed to said absorbing means.

6. The process according to claim 5 wherein
(i) said second portion is cooled and is thereafter combined with at least a portion of said at least one liquid stream to form a combined stream;
(ii) said combined stream is cooled to condense substantially all of said combined stream and is thereafter expanded to said lower pressure whereby said combined stream is further cooled;
(iii) said expanded cooled combined stream is supplied as said top feed to said absorbing means;
(iv) any remaining portion of said at least one liquid stream is expanded to said lower pressure and is supplied as said additional bottom feed to said absorbing means; and
(v) said distillation vapor stream is heated in said one or more heat exchange means, thereby to supply at least a portion of the cooling of steps (a) and (ii).

7. The process according to claim 2 wherein
(1) said heat and mass transfer means is arranged in upper and lower regions; and
(2) said expanded at least a portion of said at least one liquid stream is supplied to said processing assembly to enter between said upper and lower regions of said heat and mass transfer means.

8. The process according to claim 3 wherein
(1) said heat and mass transfer means is arranged in upper and lower regions; and
(2) said expanded any remaining portion of said at least one liquid stream is supplied to said processing assembly to enter between said upper and lower regions of said heat and mass transfer means.

9. The process according to claim 5 wherein
(1) said heat and mass transfer means is arranged in upper and lower regions; and
(2) said expanded at least a portion of said at least one liquid stream is supplied to said processing assembly to enter between said upper and lower regions of said heat and mass transfer means.

10. The process according to claim 6 wherein
(1) said heat and mass transfer means is arranged in upper and lower regions; and
(2) said expanded any remaining portion of said at least one liquid stream is supplied to said processing assembly to enter between said upper and lower regions of said heat and mass transfer means.

11. The process according to claim 2, 3, 5, 6, 7, 8, 9, or 10 wherein said separating means is housed in said processing assembly.

12. The process according to claim 1 wherein
(1) a gas collecting means is housed in said processing assembly;
(2) an additional heat and mass transfer means is included inside said gas collecting means, said additional heat and mass transfer means including one or more passes for an external refrigeration medium;
(3) said cooled gas stream is supplied to said gas collecting means and directed to said additional heat and mass transfer means to be further cooled by said external refrigeration medium; and
(4) said further cooled gas stream is divided into said first and second streams.

13. The process according to claim 4 wherein
(1) a gas collecting means is housed in said processing assembly;
(2) an additional heat and mass transfer means is included inside said gas collecting means, said additional heat and mass transfer means including one or more passes for an external refrigeration medium;
(3) said cooled first portion is supplied to said gas collecting means and directed to said additional heat and mass transfer means to be further cooled by said external refrigeration medium; and
(4) said further cooled first portion is expanded to said lower pressure and is thereafter supplied as said bottom feed to said absorbing means.

14. The process according to claim 2, 3, 5, 6, 7, 8, 9, or 10 wherein
(1) an additional heat and mass transfer means is included inside said separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

15. The process according to claim 11 wherein
(1) an additional heat and mass transfer means is included inside said separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

16. The process according to claim 1, 2, 3, 4, 5, 6, 7, 8, 9, 10, 12, or 13 wherein said heat and mass transfer means includes one or more passes for an external heating medium to supplement the heating supplied by said feed gas for said stripping of said more volatile components from said distillation liquid stream.

17. The process according to claim 11 wherein said heat and mass transfer means includes one or more passes for an external heating medium to supplement the heating supplied by said feed gas for said stripping of said more volatile components from said distillation liquid stream.

18. The process according to claim 14 wherein said heat and mass transfer means includes one or more passes for an external heating medium to supplement the heating supplied by said feed gas for said stripping of said more volatile components from said distillation liquid stream.

19. The process according to claim 15 wherein said heat and mass transfer means includes one or more passes for an external heating medium to supplement the heating supplied by said feed gas for said stripping of said more volatile components from said distillation liquid stream.

20. An apparatus for the separation of a gas stream containing methane, $C_2$ components, $C_3$ components, and heavier hydrocarbon components into a volatile residue gas fraction and a relatively less volatile fraction containing a major portion of said $C_2$ components, $C_3$ components, and heavier hydrocarbon components or said $C_3$ components and heavier hydrocarbon components comprising
    (1) first dividing means to divide said gas stream into first and second portions;
    (2) first heat exchange means housed in a single equipment item processing assembly and connected to said first dividing means to receive said first portion and cool said first portion;
    (3) heat and mass transfer means housed in said processing assembly and connected to said first dividing means to receive said second portion and cool said second portion;
    (4) combining means connected to said first heat exchange means and said heat and mass transfer means to receive said cooled first portion and said cooled second portion and form a cooled gas stream;
    (5) second dividing means connected to said combining means to receive said cooled gas stream and divide said cooled gas stream into first and second streams;
    (6) second heat exchange means housed in said processing assembly and connected to said second dividing means to receive said first stream and cool said first stream sufficiently to substantially condense said first stream;
    (7) first expansion means connected to said second heat exchange means to receive said substantially condensed first stream and expand said substantially condensed first stream to lower pressure;
    (8) absorbing means housed in said processing assembly and connected to said first expansion means to receive said expanded cooled first stream as a top feed thereto;
    (9) second expansion means connected to said second dividing means to receive said second stream and expand said second stream to said lower pressure, said second expansion means being further connected to said absorbing means to supply said expanded second stream as a bottom feed thereto;
    (10) vapor collecting means housed in said processing assembly and connected to said absorbing means to receive a distillation vapor stream from an upper region of said absorbing means;
    (11) said second heat exchange means being further connected to said vapor collecting means to receive said distillation vapor stream and heat said distillation vapor stream, thereby to supply at least a portion of the cooling of step (6);
    (12) said first heat exchange means being further connected to said second heat exchange means to receive said heated distillation vapor stream and further heat said heated distillation vapor stream, thereby to supply at least a portion of the cooling of step (2), and thereafter discharging said further heated distillation vapor stream from said processing assembly as said volatile residue gas fraction;
    (13) liquid collecting means housed in said processing assembly and connected to said absorbing means to receive a distillation liquid stream from a lower region of said absorbing means;
    (14) said heat and mass transfer means being further connected to said liquid collecting means to receive said distillation liquid stream and heat said distillation liquid stream, thereby to supply at least a portion of the cooling of step (3) while simultaneously stripping the more volatile components from said distillation liquid stream, and thereafter discharging said heated and stripped distillation liquid stream from said processing assembly as said relatively less volatile fraction; and
    (15) control means adapted to regulate the quantities and temperatures of said feed streams to said absorbing means to maintain the temperature of said upper region of said absorbing means at a temperature whereby the major portions of the components in said relatively less volatile fraction are recovered.

21. The apparatus according to claim 20 wherein
(a) said combining means is adapted to receive said cooled first portion and said cooled second portion and form a partially condensed gas stream;
(b) a separating means is connected to said combining means to receive said partially condensed gas stream and separate said partially condensed gas stream into a vapor stream and at least one liquid stream;
(c) said second dividing means is connected to said separating means to receive said vapor stream and divide said vapor stream into said first and second streams; and
(d) a third expansion means is connected to said separating means to receive at least a portion of said at least one liquid stream and expand it to said lower pressure, said third expansion means being further connected to said absorbing means to supply said expanded at least a portion of said at least one liquid stream as an additional bottom feed thereto.

22. The apparatus according to claim 21 wherein
(a) an additional combining means is connected to said second dividing means and said separating means to receive said first stream and at least a portion of said at least one liquid stream and form a combined stream;
(b) said second heat exchange means housed is connected to said additional combining means to receive said combined stream and cool said combined stream sufficiently to substantially condense said combined stream;
(c) said first expansion means is connected to said second heat exchange means to receive said substantially condensed combined stream and expand said substantially condensed combined stream to lower pressure;
(d) said absorbing means is connected to said first expansion means to receive said expanded cooled combined stream as a top feed thereto;
(e) said third expansion means is connected to said separating means to receive any remaining portion of said at least one liquid stream and expand said any remaining portion of said at least one liquid stream to said lower pressure, said third expansion means being further connected to said absorbing means to supply said expanded any remaining portion of said at least one liquid stream as an additional bottom feed thereto; and
(f) said second heat exchange means being further connected to said vapor collecting means to receive said distillation vapor stream and heat said distillation vapor stream, thereby to supply at least a portion of the cooling of step (b).

23. The apparatus according to claim 20 wherein
(a) said second heat exchange means is connected to said heat and mass transfer means to receive said cooled second portion and further cool said cooled second portion sufficiently to substantially condense said cooled second portion;
(b) said first expansion means is connected to said second heat exchange means to receive said substantially condensed second portion and expand said substantially condensed second portion to lower pressure;
(c) said absorbing means is connected to said first expansion means to receive said expanded cooled second portion as said top feed thereto;
(d) said second expansion means is connected to said first heat exchange means to receive said cooled first portion and expand said cooled first portion to said lower pressure, said second expansion means being further connected to said absorbing means to supply said expanded cooled first portion as said bottom feed thereto; and
(e) said second heat exchange means being further connected to said vapor collecting means to receive said distillation vapor stream and heat said distillation vapor stream, thereby to supply at least a portion of the cooling of step (a).

24. The apparatus according to claim 23 wherein
(a) said first heat exchange means is adapted to receive said first portion and cool said first portion sufficiently to partially condense said first portion;
(b) a separating means is connected to said first heat exchange means to receive said partially condensed first portion and to separate said partially condensed first portion into a vapor stream and at least one liquid stream;
(c) said second expansion means is connected to said separating means to receive said vapor stream and expand said vapor stream to said lower pressure, said second expansion means being further connected to said absorbing means to supply said expanded vapor stream as said first bottom feed thereto; and
(d) a third expansion means is connected to said separating means to receive at least a portion of said at least one liquid stream and expand said portion of said at least one liquid stream to said lower pressure, said third expansion means being further connected to said absorbing means to supply said expanded at least a portion of said at least one liquid stream as an additional bottom feed thereto.

25. The apparatus according to claim 24 wherein for the separation of a gas
(a) said combining means is adapted to be connected to said heat and mass transfer means and said separating means to receive said cooled second portion and at least a portion of said at least one liquid stream and form a combined stream;
(b) said second heat exchange means is connected to said combining means to receive said combined stream and cool said combined stream sufficiently to substantially condense said combined stream;
(c) said first expansion means is connected to said second heat exchange means to receive said substantially condensed combined stream and expand said substantially condensed combined stream to lower pressure;
(d) said absorbing means is connected to said first expansion means to receive said expanded cooled combined stream as said top feed thereto;
(e) said third expansion means is connected to said separating means to receive any remaining portion of said at least one liquid stream and expand said any remaining portion of said at least one liquid stream to said lower pressure, said third expansion means being further connected to said absorbing means to supply said expanded any remaining portion of said at least one liquid stream as said additional bottom feed thereto; and
(f) said second heat exchange means being further connected to said vapor collecting means to receive said distillation vapor stream and heat said distillation vapor stream, thereby to supply at least a portion of the cooling of step (b).

26. The apparatus according to claim 21 wherein
(1) said heat and mass transfer means is arranged in upper and lower regions; and
(2) said processing assembly is connected to said third expansion means to receive said expanded at least a portion of said at least one liquid stream and direct said expanded at least a portion of said at least one liquid stream between said upper and lower regions of said heat and mass transfer means.

27. The apparatus according to claim 22 wherein
(1) said heat and mass transfer means is arranged in upper and lower regions; and
(2) said processing assembly is connected to said third expansion means to receive said expanded any remaining portion of said at least one liquid stream and direct said expanded any remaining portion of said at least one liquid stream between said upper and lower regions of said heat and mass transfer means.

28. The apparatus according to claim 24 wherein
(1) said heat and mass transfer means is arranged in upper and lower regions; and
(2) said processing assembly is connected to said third expansion means to receive said expanded at least a portion of said at least one liquid stream and direct said expanded at least a portion of said at least one liquid stream between said upper and lower regions of said heat and mass transfer means.

29. The apparatus according to claim 25 wherein
(1) said heat and mass transfer means is arranged in upper and lower regions; and
(2) said processing assembly is connected to said third expansion means to receive said any remaining portion of said at least one expanded liquid stream and direct said any remaining portion of said at least one expanded liquid stream between said upper and lower regions of said heat and mass transfer means.

30. The apparatus according to claim 21, 22, 24, 25, 26, 27, 28 or 29 wherein said separating means is housed in said processing assembly.

31. The apparatus according to claim 20 wherein
(1) a gas collecting means is housed in said processing assembly;
(2) an additional heat and mass transfer means is included inside said gas collecting means, said additional heat and mass transfer means including one or more passes for an external refrigeration medium;

(3) said gas collecting means is connected to said combining means to receive said cooled gas stream and direct said cooled gas stream to said additional heat and mass transfer means to be further cooled by said external refrigeration medium; and
(4) said second dividing means is adapted to be connected to said gas collecting means to receive said further cooled gas stream and divide said further cooled gas stream into said first and second streams.

32. The apparatus according to claim 23 wherein
(1) a gas collecting means is housed in said processing assembly;
(2) an additional heat and mass transfer means is included inside said gas collecting means, said additional heat and mass transfer means including one or more passes for an external refrigeration medium;
(3) said gas collecting means is connected to said first heat exchange means to receive said cooled first portion and direct said cooled first portion to said additional heat and mass transfer means to be further cooled by said external refrigeration medium; and
(4) said second expansion means is adapted to be connected to said gas collecting means to receive said further cooled first portion and expand said further cooled first portion to said lower pressure, said second expansion means being further connected to said absorbing means to supply said expanded further cooled first portion as said bottom feed thereto.

33. The apparatus according to claim 21, 22, 24, 25, 26, 27, 28, or 29 wherein
(1) an additional heat and mass transfer means is included inside said separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

34. The apparatus according to claim 30 wherein
(1) an additional heat and mass transfer means is included inside said separating means, said additional heat and mass transfer means including one or more passes for an external refrigeration medium;
(2) said vapor stream is directed to said additional heat and mass transfer means to be cooled by said external refrigeration medium to form additional condensate; and
(3) said condensate becomes a part of said at least one liquid stream separated therein.

35. The apparatus according to claim 20, 21, 22, 23, 24, 25, 26, 27, 28, 29, 31, or 32 wherein said heat and mass transfer means includes one or more passes for an external heating medium to supplement the heating supplied by said second portion for said stripping of said more volatile components from said distillation liquid stream.

36. The apparatus according to claim 30 wherein said heat and mass transfer means includes one or more passes for an external heating medium to supplement the heating supplied by said second portion for said stripping of said more volatile components from said distillation liquid stream.

37. The apparatus according to claim 33 wherein said heat and mass transfer means includes one or more passes for an external heating medium to supplement the heating supplied by said second portion for said stripping of said more volatile components from said distillation liquid stream.

38. The apparatus according to claim 34 wherein said heat and mass transfer means includes one or more passes for an external heating medium to supplement the heating supplied by said second portion for said stripping of said more volatile components from said distillation liquid stream.

* * * * *